United States Patent Office 3,551,384
Patented Dec. 29, 1970

3,551,384
WATER SOLUBLE POLYMERS OF DIACETONE ACRYLAMIDE
Herbert J. Zeh, Jr., Pittsburgh, Pa., assignor to Calgon Corporation, Pittsburgh, Pa.
No Drawing. Continuation of application Ser. No. 738,089, June 19, 1968. This application Mar. 16, 1970, Ser. No. 18,792
Int. Cl. C08g *15/00*
U.S. Cl. 260—63                      3 Claims

ABSTRACT OF THE DISCLOSURE

Novel copolymers are disclosed comprising units derived from diacetone acrylamide and diallyl dialkyl quaternary ammonium compounds.

---

This application is a continuation of application S.N. 738,089, filed June 19, 1968, and now abandoned.

BACKGROUND OF THE INVENTION

In U.S. Pat. 3,277,056, Coleman discloses a series of new compounds referred to as N-3-oxohydrocarbon-substituted acrylamides. The simplest compound of the series has the formula:

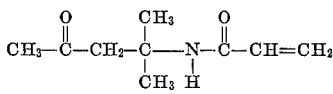

and is commonly referred to as diacetone acrylamide. The series of compounds are disclosed to be useful to form polymers with copolymerizable monomers. A large number of copolymerizable monomers are contemplated and disclosed in the patent. See columns four and five of U.S. Pat. 3,277,056. Most of the proposed comonomers are polymerizable monovinyl monomers. It will be observed that the only mention of divinyl monomers is made with reference to a situation where cross-linking is desired. In column five, for example, it is stated "if a still higher degree of rigidity is desired, a monomer mixture may be used in which a small amount of the bifunctional monomer is included such as divinyl benzene which will cross link the polymer."

In U.S. Pat. 3,288,770 Butler discloses a series of water-soluble quaternary ammonium polymers derived from monomers including two allyl groups. He has demonstrated that such di-unsaturated compounds do not cross-link; on the contrary, they form linear water soluble polymers. Schuller and Thomas in U.S. Pat. 2,923,701, have disclosed that such diallyl quaternary ammonium monomers are copolymerizable with acrylamide. The resulting copolymers, within the ratios and concentrations disclosed, are water-soluble.

Various methods of preparing and polymerizing N-[1-(1-substituted-2-oxopropyl)] acrylamides are discussed by Iwakura, Toda, and Suzuki in 5 Jour. Polymer Sci. 1599–1607 (1967).

SUMMARY OF THE INVENTION

I have invented a series of polymers which are water-soluble, of high molecular weight, and which are highly versatile in end use. They may be cross-linked after formation. They contain relatively high concentrations, or at least easily controlled numbers, of cationic sites. My copolymers include at least 1% by weight diacetone acrylamide and at least 1% dialkyl diallyl ammonium compound. In addition, the balance of my new polymers may comprise acrylamide and/or monomers of the group acrylic acid, acrylic esters, and acrylonitrile. My new polymers may be expressed in the following manner:

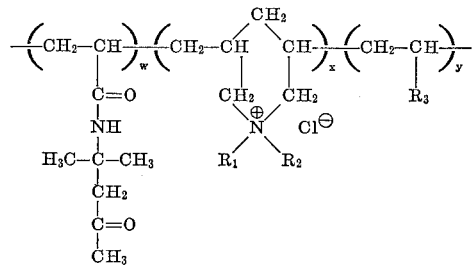

where, by weight, $w$ is 1–60 percent, $x$ is 1–99 percent, and $y$ is the balance, $R_1$ and $R_2$ being alkyl groups from 1–18 carbon atoms and $R_3$ being of the group

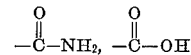

or a salt thereof, $-COOR_4$ where $R_4$ is 1–10, and $-C\equiv N$.

For many uses of my novel polymers, such as flocculating, it is preferred to utilize a readily water-soluble polymer. Depending on the desired distribution of cationic sites to be imparted by the diallyl compound, more or less ionogenic groups may be needed to improve the solubility characteristics of the polymer. For most purposes, I prefer to complete the polymer with acrylamide. Generally speaking, acrylamide will combine the advantage of economy with the ability to generate a high-molecular-weight product which is readily water-soluble. My preferred polymer therefore may be described, by weight, as a water-soluble polymer of 5 to 50 percent diacetone acrylamide, 5 to 95% dimethyl diallyl ammonium chloride, and the balance acrylamide if any additional is needed to make 100%.

After polymerization, the amide groups of the acrylamide may be hydrolyzed to the acid form and/or a corresponding salt as is known to those skilled in the art.

If hydrolysis is not desired for any reason, a copolymer of diacetone acrylamide (DAAA) and dimethyl diallyl ammonium chloride (DMDAAC) is contemplated. Copolymers having 1–60% by weight DAA and 40–99% DMDAAC are within the scope of my invention. Any copolymer of DAA and DMDAAC which is water-soluble is contemplated.

Representative examples of my polymers may be made as illustrated in the following examples:

EXAMPLE I

Terpolymer of acrylamide, dimethyl diallyl ammonium chloride (DMDAAC) and diacetone acrylamide (DAA)

70 gm. acrylamide, 20 gm. DAA, and 10 gm. DMDAAC were dissolved in 400 gm. of $H_2O$. The resulting solution was now 20% active. 1.5 gm. sodium salicylate and 0.5 gm. of EDTA were added, and the pH was adjusted to 3.5. The solution was stirred for one hour, and the pH was again adjusted to 6.5 with 50% NaOH. The solution was heated to 40° C. and purged for one hour with $N_2$. A redox catalyst of 0.137 gm. of $(NH_4)_2S_2O_8$ was added followed by a solution of 0.14 gm./l. in sodium metabisulfite and 0.009 gm./l. in cupric sulfate. The catalyst solution was pumped into the mixture at a rate of 0.1 ml./min. for 100 min. The reaction was held for ½ hour, then cooled to 25° C. and the product was isolated.

EXAMPLE II

Terpolymer of acrylamide, DMDAAC and DAA

The composition of the terpolymer by weight was 60% acrylamide, 20% DMDAAC, and 20% DAA. 60 gm. acrylamide, 20 gm. DMDAAC and 20 gm. DAA were dissolved in 400 gm. of H₂O to make a solution 20% active. 1.5 gm. of sodium salicylate and 0.5 gm. EDTA were added, and the pH adjusted to 3.5 with conc. H₂SO₄ and stirred for one hour. The pH was then adjusted to 6.5 with 50% NaOH. The solution was heated to 40° C. and purged for one hour with N₂. The redox catalyst used was a slug of .13 gm. $(NH_4)_2S_2O_8$ followed by a solution that was 0.136 gm./l. of sodium metabisulfite and 0.01 gm./l. of cupric sulfate. The catalyst solution was introduced at a rate of 0.1 ml./min. for 100 min. The reaction was held for ½ hour, cooled and the terpolymer isolated.

EXAMPLE III

Terpolymer of acrylamide, DMDAAC and DAA

The composition of the terpolymer by weight was: 50% DMDAAC, 40% acrylamide and 10% DAA. 50 gm. DMDAAC, 40 gm. of acrylamide, and 10 gm. of DAA were dissolved in 400 gm. of H₂O, resulting in a solution which was 20% active. 1.5 gm. sodium salicylate and 0.5 gm. EDTA were added, and the pH adjusted to 3.5 with conc. H₂SO₄ and stirred for one hour. The pH was again adjusted to 6.5 with 50% NaOH. The solution was heated to 40° C. and purged for one hour with N₂. The redox catalyst used was a slug of 0.14 gm. of $(NH_4)_2S_2O_8$ followed by a solution that was 0.114 gm./l. in sodium metabisulfite and 0.0097 gm./l. in cupric sulfate. It was pumped in at a rate of 0.1 ml./min. for 100 min. After recovery of the terpolymer, a sample of it was hydrolyzed by the addition of caustic soda sufficient to hydrolyze the amide groups to the extent of 10 mole percent of DMDAAC, thus obtained a ratio of cationic to anionic sites of 10:1.

EXAMPLE IV

Terpolymer of acrylamide, DMDAAC and DAA

The composition of the terpolymer by weight was: 50% DMDAAC, 30% acrylamide, and 20% DAA. 50 gm. of DMDAAC, 30 gm. acrylamide and 20 gm. DAA were dissolved in 400 gm. of H₂O, resulting in a solution 20% active. 1.5 gm. sodium salicylate and 0.5 gm. EDTA were added, and then pH was adjusted to 3.5 with conc. H₂SO₄ followed by stirring for one hour. The pH was again adjusted to 6.5 with 50% NaOH. The solution was heated to 40° C. and purged for one hour with N₂. The redox catalyst was a slug of 0.144 gm. $(NH_4)_2S_2O_8$ followed by a solution of 0.106 gm./l. in sodium bisulfite and 0.004 gm./l. in cupric sulfate. The catalyst was pumped in at a rate of 0.1 ml./min. for 100 min.

A portion of the polymer was hydrolyzed to 10 mole percent based on the amount of DMDAAC.

EXAMPLE V

Copolymer of DMDAAC and DAA

The composition of this copolymer was 50% DMDAAC and 50% DAA. A 55% solution of DMDAAC was prepared containing 100 gm. DMDAAC. It was heated to 90° C. and purged for one hour with N₂. A separate solution of 100 gm. DAA was prepared in 466 gm. of water, heated to 90° C. and purged for one hour with N₂. Pumping of persulfate catalyst was begun ($5 \times 10^{-5}$ moles catalyst/mole monomer/min.) into DMDAAC. After 10 min., pumping DAA solution was begun and increased to keep the catalyst ratio the same. The reaction was held for one hour, after which the polymer was isolated.

EXAMPLE VI

Copolymer of 90% DMDAAC and 10% DAA

In this preparation, a 60% active solution of 180 gm. DMDAAC and 20 gm. DAA was prepared, and the pH adjusted to 6.5 with dilute HCl. The solution was heated to 80° C. and purged for one hour with N₂. A catalyst solution of 13.1 gm. $(NH_4)_2S_2O_8$ per 100 ml. H₂O was introduced at a rate of 0.1 ml./min. for 100 min. Catalyst ratio was $5 \times 10^{-5}$ moles catalyst/mole monomer/min. The reaction was held for ½ hour at 106° C. 166 gm. H₂O was added to dilute the final polymer solution to 40%.

One gram of hydrazine is needed for each 100 grams of active polymer in order to crosslink 100%.

EXAMPLE VII

Copolymer of 95% DMDAAC and 5% DAA

A 60% solution was prepared of 190 gm. DMDAAC and 10 gm. DAA, and the pH adjusted to 6.5 with dilute HCl. The solution was heated to 80° C. and purged for one hour with N₂. A catalyst solution of 14.1 gm. of $(NH_4)_2S_2O_8$ per 100 ml. H₂O was introduced at a rate of 0.1 ml./min. for 100 min. The catalyst ratio was $5 \times 10^{-5}$ moles catalyst/mole monomer/min. based on DMDAAC. The reaction was held for ½ hour at 100° C., 166 gm. of H₂O was added to dilute the sample to 40%. In order to crosslink 100% with hydrazine, 0.5 gm. hydrazine is added per 100 gm. of active polymer.

My polymers may be cross-linked with such materials as formaldehyde and latent formaldehyde donors, hydrazine, diamines, aluminum isopropoxide, and other oxidizing agents, as is known to those skilled in the art.

My new polymers may be used wherever it is desired to form a film or coating. The coating will be electroconductive. The ability to be cross-linked with latent formaldehyde donors, especially renders them useful whenever it is desired to deposit a film in water-soluble form, and thereafter render the film water-insoluble.

I claim:

1. A film forming water-soluble polymer of the formula:

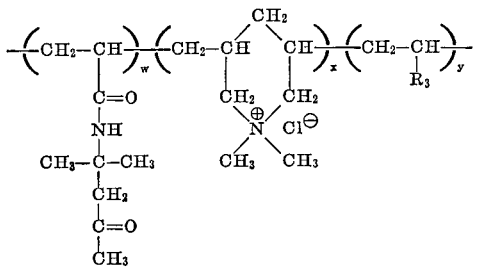

where, by weight, based on the weight of the polymer $w$ is 5 to 50 percent, $x$ is 5 to 95 percent, and $y$ is the balance, $R_3$ is selected from the group consisting of

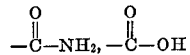

and $-COOR_4$ where $R_4$ is an alkyl group of 1 to 10 carbon atoms or $C \equiv N$.

2. Polymer of claim 1 in which $R_3$ is

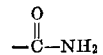

3. A film forming water-soluble copolymer consisting essentially of, by weight, based on the weight of the copolymer 5 to 50 percent diacetone acrylamide and 50 to 95 percent dimethyl diallyl ammonium chloride.

References Cited

UNITED STATES PATENTS

| | | | |
|---|---|---|---|
| 2,923,701 | 2/1960 | Schuller et al. | 260—85.5 |
| 3,277,056 | 10/1966 | Coleman | 260—63 |
| 3,425,942 | 2/1969 | Coleman | 252—51.5 |

WILLIAM H. SHORT, Primary Examiner

L. L. LEE, Assistant Examiner

U.S. Cl. X.R.

260—29.6, 29.7, 89.7

UNITED STATES PATENT OFFICE
CERTIFICATE OF CORRECTION

Patent No. 3,551,384                  Dated December 29, 1970

Inventor(s) Herbert J. Zeh, Jr.

It is certified that error appears in the above-identified patent and that said Letters Patent are hereby corrected as shown below:

Column 2, line 41, "(DAAA)" should read -- (DAA) --.
Column 3, line 32, "obtained" should read -- obtaining Signed and sealed this 2nd day of May 1972.

(SEAL)
Attest:

EDWARD M. FLETCHER, JR.            ROBERT GOTTSCHALK
Attesting Officer                 Commissioner of Patent